United States Patent [19]
Falbel

[11] 3,751,664
[45] Aug. 7, 1973

[54] INFRARED DETECTOR SYSTEM
[75] Inventor: Gerald Falbel, Stamford, Conn.
[73] Assignee: Barnes Engineering Company, Stamford, Conn.
[22] Filed: Aug. 7, 1972
[21] Appl. No.: 278,689

[52] U.S. Cl. .............................. 250/353, 250/216, 73/355
[51] Int. Cl. .............................................. G01j 5/02
[58] Field of Search .................... 250/83 R, 83.3 H, 250/216; 73/355 R

[56] References Cited
UNITED STATES PATENTS

| | | | |
|---|---|---|---|
| 3,131,304 | 4/1964 | Hager, Jr. | 250/83.3 H |
| 3,227,877 | 1/1966 | Dreyfus | 250/83.3 H |
| 3,539,803 | 11/1970 | Beerman | 250/83.3 H X |
| 3,699,339 | 10/1972 | Taczak, Jr. | 250/83.3 H |

Primary Examiner—Archie R. Borchelt
Attorney—Joseph Levinson and Robert Ames Norton

[57] ABSTRACT

A detector flake, such as a pyroelectric detector, which has leads going to the two faces of the flake, is mounted in a truncated collecting cone spaced from the truncated end from one quarter to twice the diameter of the flake. A field lens is provided imaging the entrance aperture to the optical system on a focal plane which would go through the apex of the cone if it were projected. The truncation is a mirror, except for a small central hole through which one lead for the detector passes, and as a result, both sides of the detector flake are utilized. Another modification replaces the flat mirror at the truncation with a henispherical reflecting cup and a detector flake mounted on edge, that is to say, with its surfaces parallel to the axis of the cone.

7 Claims, 4 Drawing Figures

INFRARED DETECTOR SYSTEM

BACKGROUND OF THE INVENTION

Detectors for radiation, particularly infrared radiation, have been mounted on the truncation of a truncated cone with reflecting inner surface. This results in an effective magnification ratio of the detector area by the cone optic equal to the cross-section area of the image polyhedron. This has increased the sensitivity of the detector, because the larger cross-section of radiation intercepted by the image polyhedron is concentrated on the detector area. This effectively reduces the detector area for any given radiometric system, which thereby improves the sensitivity of the system. This detector system is described in my earlier U.S. Pat. No. 3,271,575 of Sept. 6, 1966. The detector described is primarily a thermal detector, such as a thermistor flake, and only one side of the flake receives radiation. A modification of my earlier patent in which the detector flake is mounted on a transparent substrate with a rear mirror, of suitable curvature, the surface being centered at the apex of the cone optics if it were not truncated. This utilizes both sides of a small detector flake, and is described in my earlier U.S. Pat. No. 3,348,058, Oct. 17, 1967, which was filed later than the application for U.S. Pat. No. 3,271,575 referred to above. The principal use of the system of the second patent is to provide a wide-angle view, for example for acquiring a target in a tracker, and a smaller angle view once acquired, which concentrates the energy from a smaller field on the small detector flake. In the second patent the radiation detector is also of normal type, such as thermal detectors or photoconductive detectors.

SUMMARY OF THE INVENTION

The present invention is an improvement on the cone optics detector systems of my two earlier patents above referred to. As in those patents, truncated cone optics are used, and as in the second mentioned patent, both sides of the detector flake are used. However, a particular kind of detector in which detector leads go to the two sides of a flake, instead of edges as in thermistors or photodetectors, is used, but is placed some distance from the truncation, within the range of one-fourth to twice the flake diameter, and preferably nearer the lower end of the above range. The detectors which are known, having the characteristics set out above, are primarily pyroelectric detectors or photovoltaic detectors, the former being preferred.

The limitations on the cone angle, i.e. the ratio of image polygon radius to detector flake radius, does not materially exceed about 12 to 15. Also, the broad idea of utilizing both sides of a detector flake, described in the second patent above referred to, is employed, but in a very different, and as will be poined out below, improved configuration.

There are two variants of the invention. In the first, the detector flake, and for simplicity in the following description the preferred pyroelectric flake will be described, is mounted at right angles to the optic axis of the truncated cone. This construction, with the existing instrument manufacturing means, is simpler, and therefore can be more economical. However, when viewed from the entrance of the cone the image polyhedron appears as a set of concentric rings separated by "dead" spaces where incoming rays do not reach the detector. The relative area at the "dead" rings to the overall image polyhedron is a function of the ratio of the detector flake area to the truncated area.

A second variant utilizes a hemispherical cup-shaped mirror and has no "dead" zones. The choice between variants is largely a balance of economic factors. In the second variant, usually the hemispherical mirror is split, the detector edge mounted in the split, with suitable insulation therefrom for at least one of the sides of the detector flake, and the cup-shaped mirror then fastened together by cementing or otherwise, and mounted on the end of the truncated cone.

The first variant, which under present instrument construction facilities is somewhat preferred, will first be described. The only change in the standard construction technique of truncated cone optics requires a Mylar layer for the truncation, which is mirrored, for example by gold plating in the case of detectors primarily intended for infrared, except for a very small hole in the center through which one lead of the pyroelectric detector flake passes. The other lead of the pyroelectric detector is a ground lead, and for example may be attached with conductive cement to the gold plating on the Mylar substrate which in turn, beyond the cone, is connected to the detector mounting which, for the instrument, constitutes ground. It will be noted that the flake must be symmetrical, such as a circular flake, or at least a many-sided polygonal shape, and the cone cross-section must be a circle.

The second variant using a hemispherical mirror and a pyroelectric or other similar detector flake on edge, i.e. with its surfaces parallel to the optic axis of the collecting optic, results in no dead zones. It is also possible with the second variant to use cone optics which are not pure circular cones, in other words, they may be pyramidal optics. For some purposes such optics present certain advantages. Another advantage of the second variant is that leads can be placed so that they do not cast a shadow on the flake.

DESCRIPTION OF THE PREFERRED EMBODIMENTS

Figure 3:
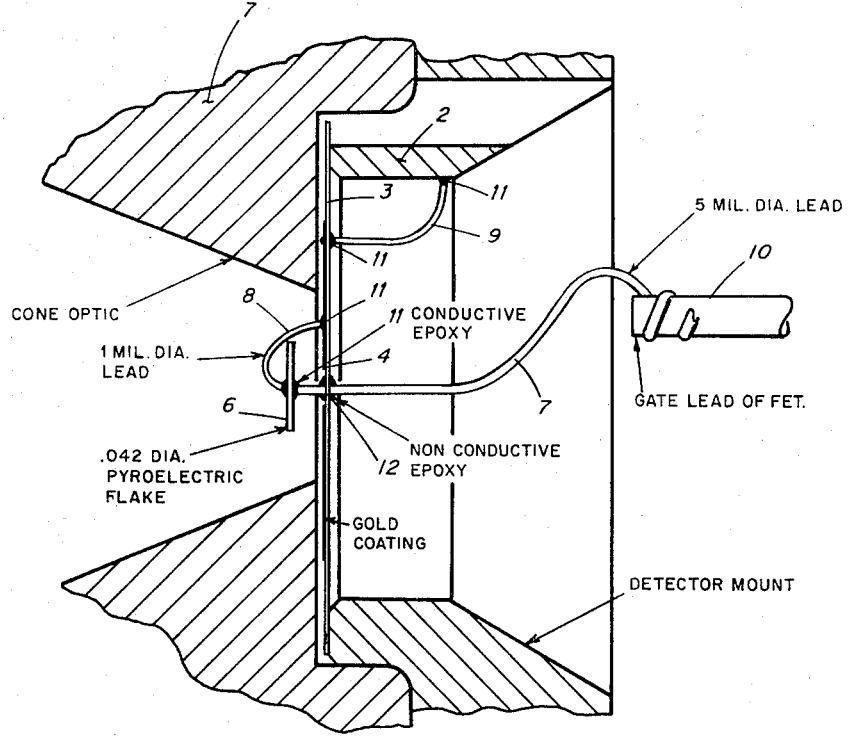
FIG. 3 is a section through the cone after mounting of the same variant.

FIG. 3 shows the cone at (1) near the truncation. The detector mounting proper is shown at (2), with a Mylar substrate (3) across the mounting, and also across the truncation of the cone, a portion of the Mylar, including that across the cone truncation, being coated with a gold mirror (4). There is a small central hole (5) through which a fine lead (7) extends to one face of the pyroelectric flake (6). The other lead (8) goes to the mirror (4) where it is attached with conductive epoxy cement, and a continuation forming ground lead (9) connects the gold plating (4) to the metal detector mount (2), which constitutes instrument ground. Leads (7) and (8) are connected to the two faces of the flake (6) by conductive epoxy cement (11), as is the ground lead (9) to the gold mirror and the detector mount. Where the lead (7) passes through the hole in the center of the Mylar substrate (3), it is attached thereto with nonconductive epoxy cement (12). The lead (7) is also connected to a gate (10) of a conventional field effect transistor (FET), which receives a signal generated by the pyroelectric flake (6) when it is irradiated. Lead (7) is about 5 mil diameter, and lead (8) about 1 mil. Their dimensions are shown somewhat exaggerated for the sake of clarity in the figure. Of course, even the 5 mil lead (7) is much finer than the gate pin of the FET (10), which is also shown exaggerated, although the relative sizes of the lead (7) and the pin (10) are substantially correct.

Figure 2:
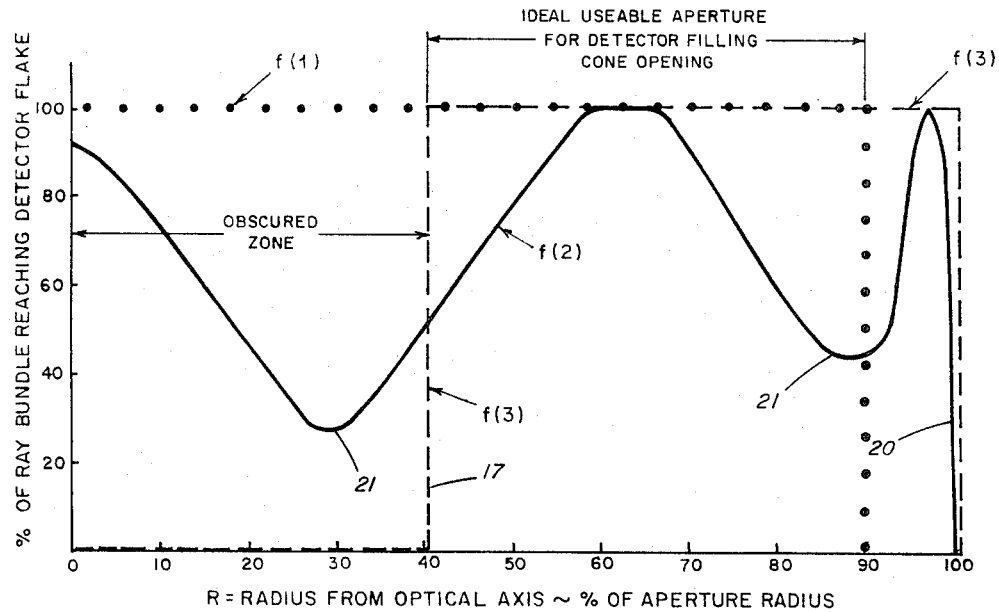
FIG. 2 is a curve showing performance of the same variant.

FIG. 2 shows a curve $f(2)$, and a dashed, or ideal curve $f(3)$, which represents the ideal usable aperture of a typical instrument. The portion of the curve $f(2)$ passes through the zone where the incoming radiant energy is obscured by the secondary mirror of a conventional Cassegrain collecting optics (not shown). As can be seen on FIG. 2, there is a field lens (13) which images the aperture of the Cassegrain system on a focal plane (14) shown in dash-dot lines, and passing through the apex of the cone (1) if it had not been truncated. This extension of the cone is shown in dashed lines. The flake itself for the particular illustration in FIGS. 2 and 3 is half the diameter of the truncation of the cone. The flake (6) is raised above the cone truncation a distance of approximately one third of its diameter.

A number of detector images around the image polygon are shown, and it will be seen that the effect of the reflection from the mirror on the substrate across the cone's truncation makes a second image (15), and it is these double images which serve to fill in some of the dead zones and provide a major portion of the improved sensitivity of the detector. (15) is of course an image and not a physical flake. Also in order to avoid confusion in the drawings, the ground lead from the other side of the pyroelectric flake and the mirror on the substrate (3) are not shown in FIG. 1. They are, of course, physically present, as was seen in FIG. 3.

Figure 1:
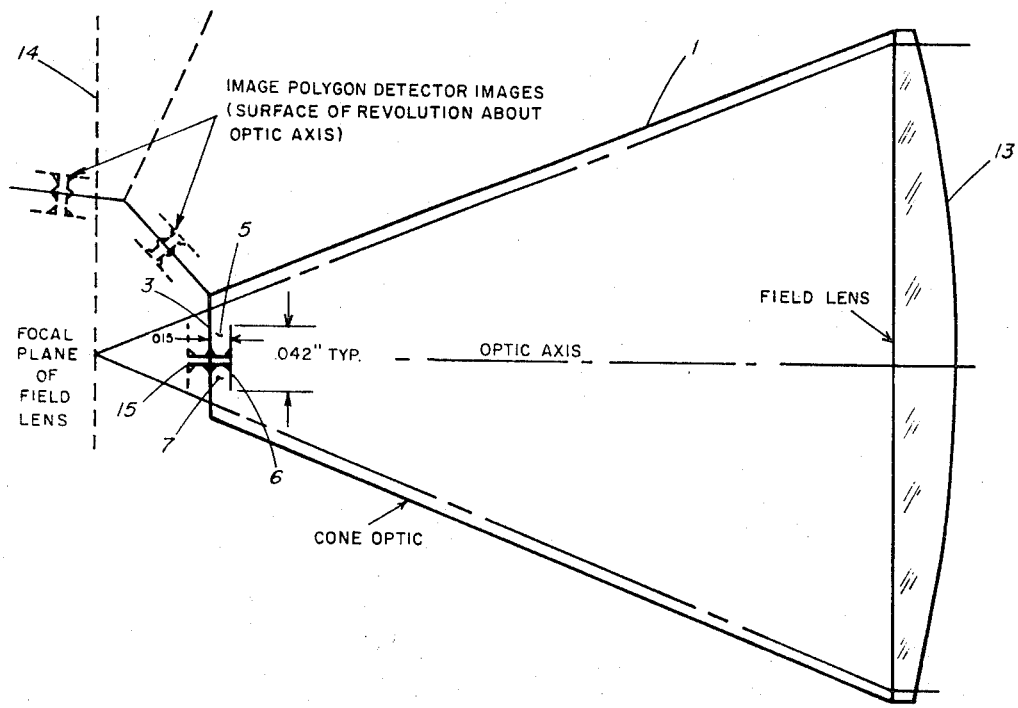
FIG. 1 is a diagrammatic representation of the optics of the first variant.

On FIG. 2 there is shown in dotted lines the energy percentage $f(1)$ received by a flake located on the truncation of the cone optics, i.e. the prior art, and it extends only to 90 percent of the entrance aperture image radius from the optical axis. The energy which enters the cone optics is shown in dashed lines as $f(3)$. It will be noted that this is zero to about 40 percent of the entrance aperture image radius (which represents the obscuration of the secondary mirror in the Cassegrain optical system). $f(2)$ is the curve of the percentage of incoming energy received by a flake indented from the cone truncation as shown in FIGS. 1 and 3. It will be noted that this curve as well as $f(3)$ extends to 100 percent. This results from the indentation of the flake from the truncation of the cone and adds an area from 90 percent to 100 percent of aperture image radius which makes up to some extent for the dead zones in the response of $f(2)$ shown at (21). (17) is the area under $f(2)$ from 40 percent to 90 percent, and (20) the additional area under the same curve from 90 percent to 100 percent. While it appears that there is considerable loss from 0 to 40 percent, these are rings that are near the optic axis and represent, therefore, relatively small areas. While the area from 40 percent to 100 percent under $f(2)$ is somewhat less than the area under $f(1)$, it should be remembered that the flake area for $f(2)$ is one-fourth of the flake area for $f(1)$, and this results in a net gain, as will be seen in the sensitivity improvement factor calculation presented below. The pronounced dead zone in $f(2)$ at 30 percent is inconsequential because it lies in the zone from 0 to 40 percent obscured by the second mirror of the Cassegrain optics. The computation for increase in sensitivity is as follows:

Sensitivity Improvement Factor $$= \frac{\int_0^{100\%} [f(2)][f(3)] R dR}{\int_0^{100\%} [f(1)][f(3)] R dR} \times \sqrt{\frac{A_T}{A_F}}$$

where
$A_T$ = Area of cone truncation
  = Detector flake area for $f(1)$
$A_F$ = Detector flake area for $f(2)$ For the example described above, $A_F = A_T/4$. Therefore, for these parameters, sensitivity improvement factor = 1.62. It should be noted that while the equation represented by the integrals has a smaller numerator than denominator, this is more than compensated by the second factor, because $A_F$ is one quarter $A_T$, in other words, an increase of 2 after taking the square root. Although the leads (7) and (8) are extremely small, they do have some shadowing effect, reducing the improvement factor of 1.62 slightly. However, the sensitivity improvement is still well over 1.4.

The example shown in FIGS. 1-3 is a typical useful example, but the position and size of the flake (6) can be varied somewhat within the range of an indentation from the substrate across the truncation from one-fourth to twice the flake diameter. The position for any particular size of apparatus to maximize gain can be determined by a computer. In fact, the choice of the dimensions shown in FIGS. 1 and 3 involves investigation of a number of flake sizes and indentations from the substrate. It will be noted that the effect of the present invention involves optimization of two relative factors: diameter of the flake, and indentation from the substrate. The smaller the flake the greater the potential sensitivity improvement. However, the smaller the flake the greater the proportion of dead zones to image polyhedron area, which reduces the sensitivity improvement.

Ideally, the flake should be circular, but a very close approximation can be obtained from a shape which is a polygon of a number of sides, for example octagonal, which can easily be obtained by cutting a square flake, the usual form for a pyroelectric raw material, or by sandblasting a larger flake through a circular mask. Shapes of the pyroelectric detector are not changed by the present invention, which is a practical manufacturing advantage.

As has been pointed out above, the first variant shown in FIGS. 1-3 uses standard detector manufacture and mounting techniques, and so represents a manufacturing advantage, which is sometimes translatable into lower manufacturing costs.

Figure 4:
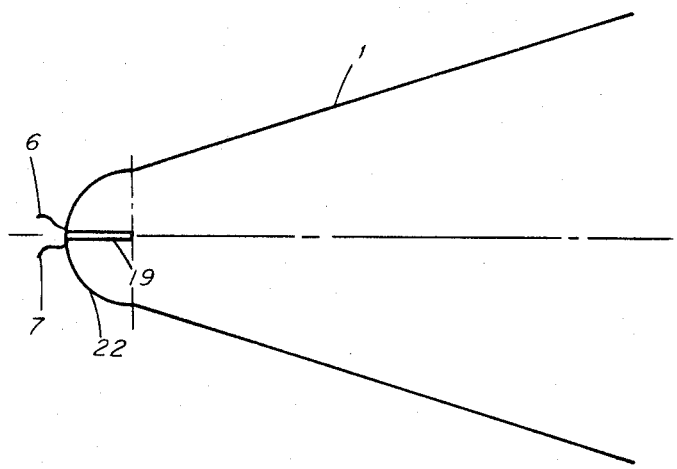
FIG. 4 is a diagrammatic illustration of a second variant with a hemispherical cup mirror.

The second variant is shown diagrammatically in FIG. 4, the cone again being shown at (1), with the hemispherical cup mirror (22) with a flake (19) mounted in the center parallel to the optic axis of the cone. In practice the mirror (22) is usually made in two pieces, holding the edge of the flake (19) and the mirror, then cemented together. Of course one side of the pyroelectric flake (19) must be insulated from the metal of the mirror, whereas the other side is grounded against the mirror, which in turn is connected to the main metal mounting of the whole detector assembly, which is not shown as it is not changed from that shown in FIG. 3 except for the shape of the cup mirror. The increase by reason of the image polygon is the same as for the first variant. In the second variant it will be noted that it is not necessary to use a field lens, since there are no dead zones. The maximum detector flake area reduction possible in the second variant is only 2:1, resulting in a maximum sensitivity improvement of $\sqrt{2}$. This limit holds even though there are no dead zones, but there is an additional advantage because, as will be seen from FIG. 4, the leads to the flake do not shadow it.

The second variant also has another property: namely that it is not necessary that the collecting optics (1) be a cone with circular cross-section, since other cross-sections, such as a square pyramid, are also usable with suitable changes in the configuration of the mirrored cup. As has been pointed out above, such a pyramidal collecting optics is not suitable for the first variant.

As has been stated, the present invention is useful with any type of detector in which the sides to which the leads connect are conductive. It is not useful where the flow of current is across the flake as in a thermistor flake, or in a photoconductive element. Pyroelectric detector flakes are simple, sensitive, even without cooling, and are therefore preferred. However, the invention is usable with other detectors, such as photovoltaic detectors, cooled or uncooled, for example an indium antimonide detector flake. In the present state of the art, pyroelectric detectors show marked advantages, and so may be considered as the preferred type of detector. However, the fact that other detectors, such as photovoltaic detectors, may be used, presents a desirable flexibility which permits the present invention to be used with various suitable detector designs.

The particular dimensions of the truncated conical optic can be varied, as is described in the earlier U.S. Pat. No. 3,271,575, but as there, there is a limit to the truncation, which should not have a ratio-to-image polygon diameter of more than about 12 to 15. It will be noted that variations of the conical optic represent compromises, for if the truncation is very small, a much smaller flake may be used. The size given in FIG. 1 is a useful example for a cone of the angle and truncation shown in FIG. 3. With other dimensions of optics, maximization may dictate somewhat different detector flake sizes and indentations from the truncation. This maximization is easily effected by computer use, but in each case will fall within the practical limit set out above for indentation as compared with flake diameter.

I claim:

1. In an instrument for detecting optical radiation which includes optical imaging means positioned to produce a real image substantially in a focal plane, and reflective truncated conical optics the cone angle and location being such that the cone apex if the cone had not been truncated would be located in the said focal plane, the improvement which comprises
   a. a detector flake for radiation of the type in which detector leads are connected to opposite sides of the detector, the detector being mounted spaced from the truncation of the cone and of smaller diameter than the truncation, the ratio between diameter and spacing from the truncation being in the range of one quarter to twice the diameter of the flake,
   b. a substrate across cone truncation provided with a mirrored surface and a central opening,
   c. a combined mounting means and lead to one side of the detector flake extending through said opening and insulated from said mirror, and
   d. a ground lead to the opposite side of the flake, whereby radiation is reflected and both sides of the detector flake receive radiation.

2. An instrument according to claim 1 in which the detector flake is a pyroelectric detector.

3. An instrument according to claim 2 in which the lead from the detector flake passing through the substrate across cone truncation constitutes the mounting means maintaining the flake at the predetermined position.

4. An instrument according to claim 2 in which the optical imaging means comprise a Cassegrain system and a field lens at the base of the cone imaging the aperture of the Cassegrain system onto said focal plane.

5. An instrument for detecting optical radiation comprising in combination,
   a. optical imaging means to produce a real image substantially in the focal plane of the imaging means,
   b. a truncated element in the optical path between the optical imaging means and the focal plane the inner surface of said element being reflective at the wavelength of the radiation to be detected,
   c. a cup-shaped mirror attached to the truncated end of the element, and
   d. a detector flake of the type having detector leads from each side of the flake mounted on the cup-shaped mirror parallel to and at the optical axis of the reflective element, one lead being insulated from said cup-shaped mirror and the other from the other side of the flake constituting a ground lead, whereby radiation entering into the optical element from the optical imaging means is reflected onto both sides of the detector element.

6. An instrument according to claim 5 in which the truncated element is a truncated cone of circular cross-section.

7. An instrument according to claim 6 in which the detector flake is a pyroelectric detector flake.

* * * * *